Figure 1:
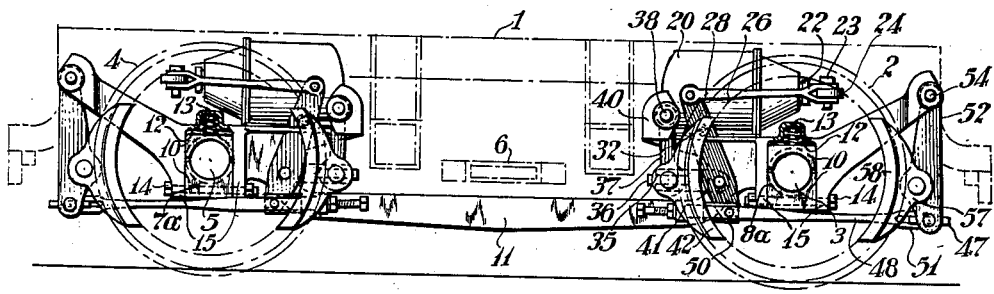

Nov. 12, 1940.  T. R. McGOWAN  2,221,714

BRAKE RIGGING

Filed Sept. 16, 1938

INVENTOR
Thomas R. McGowan
BY
HIS ATTORNEY

Patented Nov. 12, 1940

2,221,714

UNITED STATES PATENT OFFICE 2,221,714

BRAKE RIGGING

Thomas R. McGowan, Pittsburgh, Pa., assignor to The American Brake Company, Swissvale, Pa., a corporation of Missouri Application September 16, 1938, Serial No. 230,295

7 Claims. (Cl. 188—58)

My invention relates to brake rigging, and particularly to brake rigging of the clasp type for railway vehicle trucks which are intended to be used on modern high speed trains.

With clasp brakes as they are now generally constructed, when a brake application takes place, the frictional forces which are set up by the rotation of the wheels tend to move one shoe on each wheel downwardly and the other shoe upwardly. Furthermore, if the shoes are hung below the horizontal center lines of the wheels as frequently happens for clearance or other practical reasons, the forces which are exerted on the shoes to move them into frictional engagement with the wheels cause a downward component to be exerted on the shoes which tends to move them downwardly along the treads of the wheels. These two forces will of course tend to offset each other in the case of the shoe which is urged upwardly by the frictional force, but it has been ascertained that the downward force will always exceed the upward force, so that the net tendency of the forces exerted on both shoes is to move the shoes downwardly relative to the wheels. The downward forces which are exerted on the shoes are of course transmitted to the portion of the truck which supports the brake rigging, and when this portion of the truck is the frame as has heretofore generally been the case, these reaction forces must be resisted by the truck springs. As long as the car speeds are relatively low, the brake shoe pressures required are relatively low, and under these conditions the reaction forces which are transmitted to the frame are insufficient to be objectionable. However, as the car speed increases, the brake shoe pressures required increase with the result that at the higher car speeds the reaction forces become sufficiently great to pull the truck frame downwardly until it meets a solid stop, or at least until the truck springs become substantially fully compressed, it being noted that as the springs become compressed, the distance between the brake shoes and the horizontal center line of the wheels increases which acts to further increase the downward force component acting on the truck frame. When the truck springs become compressed, the wheels cannot fully adjust themselves to vertical inequalities in the track rails, and, as one or more of the wheels pass over the uneven sections of the rails, they may for an instant have a tendency to leave the rails, or to at least have a greatly reduced frictional contact therewith. The tendency of the wheels to slide is thereby greatly increased, and since wheel sliding is, for well-known reasons, very objectionable, it is extremely desirable to provide means for preventing its occurrence.

Moreover, when the brake rigging is of the usual type in which the brake shoes are located below the horizontal center line of the wheels, and the brake rigging is mounted on the truck in such manner that the reaction forces which are set up when a brake application occurs cause the truck springs to become compressed, and the brake cylinder pressure is reduced following a heavy brake application to effect a partial release of the brakes, the compressed springs act through the medium of the truck frame and brake rigging to cause the shoes to move upwardly toward the horizontal center line of the wheels. This upward movement of the brake shoes tends to maintain them in braking engagement with the wheels, and thereby offsets to a large extent the reduction in brake cylinder pressure which caused their upward movement until the shoes have been moved to their normal positions, at which time the action of the springs ceases and the partial release of the brakes is finally effected through a further reduction in brake cylinder pressure. In braking high speed trains it is desirable to be able to effect a quick partial release of the brakes with a minimum reduction in brake cylinder pressure to maintain the maximum braking effect and still prevent wheel slippage, and this upward movement of the brake shoes by the truck springs greatly increases the reduction in brake cylinder pressure which must be made before the proper partial release can be effected, and hence delays the release of the brakes. It follows, therefore, that it is also desirable to provide means for avoiding this undesirable condition.

With the above and other considerations in view, one object of my invention is to provide means for mounting brake rigging on a car truck in such manner that the forces which are set up in the brake rigging when a brake application takes place will not be transmitted to the truck frame.

Another object of my invention is to provide brake rigging for vehicle trucks which will permit a relatively high braking power of the order of 250 per cent of the weight on the truck to be applied to the truck wheels without causing the truck frame to tip or move downwardly due to the forces which are set up in the brake rigging when the brakes are applied.

A further object of my invention is to provide means for supporting the brake rigging on a car truck in such manner that the supportings means and brake rigging can readily be removed from the truck as a unit.

A further object of my invention is the provision of brake rigging in which the rotation of the wheels may be retarded without applying friction to that portion of the wheels which runs on the rails and carries the weight.

A still further object of my invention is to mount brake drums inboard of the wheels where there is adequate clearance, and to support brake rigging of the clasp type for cooperation with these brake drums by means of a brake carrier which is journaled on the axles between the drums and which is wholly independent of the truck frame.

Other objects and characteristic features of my invention will appear as the description proceeds.

I shall describe one form of brake rigging embodying my invention, and shall then point out the novel features thereof in claims.

Figure 2:
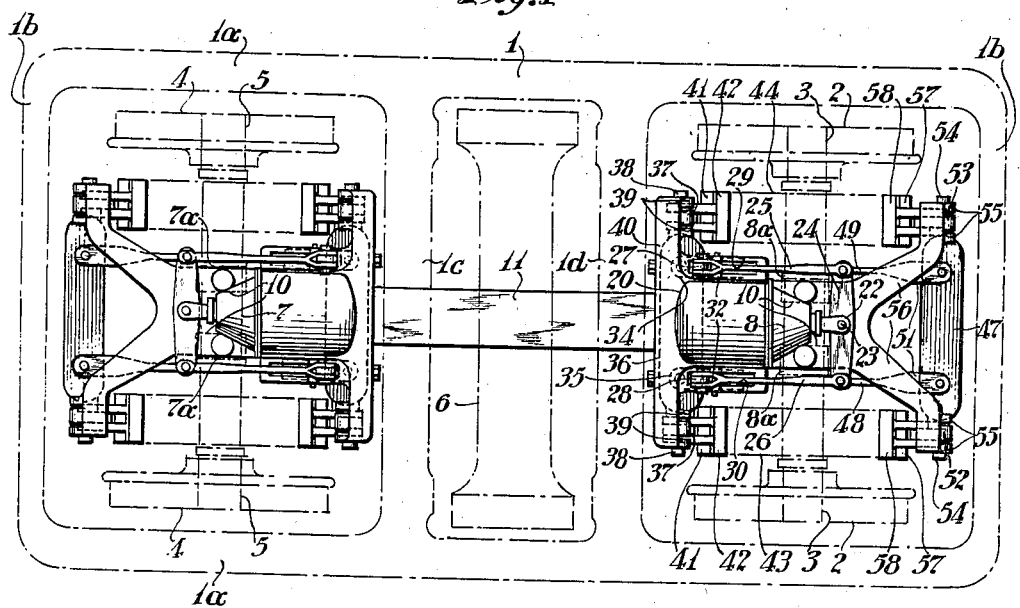
Figure 3:
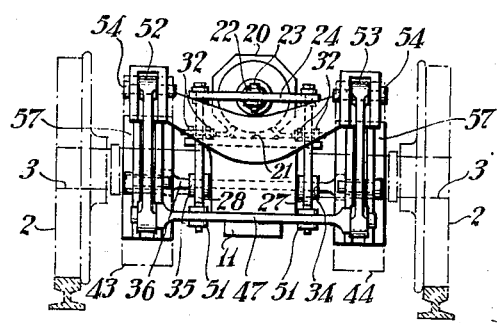

In the accompanying drawing, Fig. 1 is a side elevational view of a railway car truck provided with brake rigging embodying my invention, only a portion of the truck frame being shown to improve the showing of the brake rigging. Fig. 2 is a top plan view of the truck and brake rigging shown in Fig. 1. Fig. 3 is a right-hand end view of that portion of the brake rigging which is associated with the right-hand wheel and axle assembly in Figs. 1 and 2.

Similar reference characters refer to similar parts in each of the several views.

Referring to the drawing, I have here shown my invention applied to a four-wheel car truck comprising a truck frame 1 supported at one end by a wheel and axle assembly consisting of a pair of wheels 2 mounted on an axle 3, and at the other end by a wheel and axle assembly consisting of a pair of wheels 4 mounted on an axle 5. The truck frame 1 may have any preferred construction, and as here illustrated includes spaced side members 1a connected together by transversely extending end members 1b, and spaced center members or transoms 1c and 1d between which a conventional spring plank 6 is located. The means for supporting the truck frame by the wheel and axle assemblies, as well as the means for supporting the spring plank by the transoms are not shown because these means are well-known and comprise no part of my present invention.

The axles 3 and 5 are provided with centrally located bearing portions 7 and 8 defined at their ends by annular shoulders 7a and 8a, respectively, and disposed on each of these bearing portions are two pairs of bearing blocks 10. The bearing blocks 10 support a longitudinally extending brake carrier 11 through the medium of pedestal jaws 12 which are formed on the carrier, and which receive the blocks in a manner to permit vertical sliding movement of the carrier relative to the upper block; and interposed between the upper block of each pair and the top of the jaw is a coil spring 13, the function of which is to cushion the carrier and parts mounted thereon against excessive shock due to the hammering which takes place between the wheels and the rails. A bolt 14 extends through the lower block of each pair and through the lower ends of the pedestal legs 15 of the associated pedestal jaw, and serves with the lower block as a means to limit the vertical movement of the carrier relative to the axles. It will be noted that the central portion of the carrier extends below the spring plank, and it should be pointed out that all parts of the carrier are so located as not to interfere in any way with the truck frame or any other part or parts of the truck. It should also be pointed out that by dropping the wheel and axle assemblies and then removing the bolts 14, the carrier and parts attached thereto can be removed as a unit from the axles to permit the bearing blocks to be replaced when they become worn, or for any other reason which may make it necessary or desirable to remove the brake carrier from the truck.

The brake carrier supports the brake rigging which, in the form here illustrated, comprises two separate and independent brake mechanisms one of which is associated with each wheel and axle assembly. These two mechanisms are similar, and a description of one will therefore suffice for both.

Referring particularly to the brake mechanism associated with the wheels 2 and axle 3, this mechanism is actuated by a brake cylinder 20 which as here shown is mounted on a platform 21 formed on the brake carrier 1 directly in rear of the axle 2 in line with the center line of the truck. The brake cylinder 20 is of the usual and well-known construction, and includes the usual cylinder body, reciprocable piston (not shown) biased to the inner end of its stroke by the usual release spring (not shown), and a push rod 22 which is operatively connected at its inner end with the piston.

The outer end of push rod 22 is operatively connected by means of a pin 23 with an equalizing lever 24 intermediate its ends, and the equalizing lever 24, in turn, is operatively connected at its ends through the medium of pull rods 25 and 26 with the upper ends of a pair of floating live levers 27 and 28, respectively. The live levers 27 and 28 extend downwardly through lever slots 29 and 30 formed on the brake carrier and are movably supported from the brake carrier by means of pin and roller assemblies 32. The pin and roller assemblies are secured to the levers adjacent their upper ends, and the rollers of these assemblies ride on the brake carrier on opposite sides of the lever slots.

Intermediate their ends, the live levers 27 and 28 are connected through the medium of double jaws 34 and 35, respectively, with a brake beam 36. The brake beam 36 is suspended from the brake carrier by means of hanger links 37, the lower ends of which receive trunnions formed on the ends of the beam, and the upper ends of which are pivoted on pins 38 mounted in bifurcations 39 formed on laterally projecting arms 40 provided on the brake carrier. The trunnions formed on the end of the brake beam 36 also pivotally support brake heads 41 which carry brake shoes 42 for cooperation with brake drums 43 and 44 mounted on the axle 2 inboard of the wheels 3 on opposite sides of the bearing portion 8.

The lower ends of the live levers 27 and 28 are connected with a brake beam 47 at points equally spaced from its ends by means of pull rods 48 and 49. The pull rods 48 and 49 are each provided at the end which is connected to the associated live lever with a slack adjuster 50 of well-known construction, and at the opposite end with a jaw 51 which receives the brake beam.

The brake beam 47 is suspended from the brake carrier by means of dead levers 52 and 53, the lower ends of which receive trunnions formed on the opposite ends of the brake beam, and the upper ends of which are pivoted on pins 54 mounted in bifurcations 55 provided on diverging arms 56 formed on the forward end of the brake carrier. Each of the dead levers 52 and 53 is provided intermediate its ends with a brake head 57 carrying a brake shoe 58 for cooperation with the associated brake drum 43 or 44.

When it is desired to effect an application of the brakes, fluid pressure is simultaneously supplied to both brake cylinders in the usual manner, thereby forcing the push rods 22 outwardly in the cylinders. This outward movement of the push rods acts through the associated equalizing lever 24 and associated pull rods 25 and 26 to move the upper ends of the live levers 27 and 28 in the same direction as the push rods are moved and with equal forces. This movement of the live levers, in turn, acts through the double jaws 34 and 35 and brake beam 36 to move the brake shoes 42 into frictional engagement with the associated drums 43 and 44, and through the pull rods 48 and 49, brake beam 47 and dead levers 52 and 53 to move the brake shoes 58 into frictional engagement with the forward sides of the brake drums, thereby applying clasp brakes to the brake drums, and hence applying braking power to the wheels. When the brake shoes move into frictional engagement with the brake drums, the reaction forces set up cause the cushioning springs 13 to become compressed and allow the brake carrier to move downwardly to the point in which the upper bearing blocks 10 engage the tops of the pedestal jaws, but the amount of movement of the carrier which can take place under these conditions is not sufficient to materially affect the operation of the brake mechanism or the forces developed.

When it is desired to release the brakes, the fluid pressure which was supplied to the brake cylinders is vented to atmosphere, and the release springs in the brake cylinders then function to restore the push rods to their retracted positions and thereby effect the release of the brakes.

One advantage of brake rigging constructed in the manner described is that inasmuch as the brake rigging is suspended from a brake carrier which is journaled directly on the axles and which is wholly independent of the truck frame, none of the reaction forces which are set up during a brake application are transmitted to the truck frame, and as a result any downward movement of the frame or any tipping due to the forces which are set up in the brake rigging has been eliminated. The riding qualities of the car are therefore improved as well as the life of the truck.

Another advantage of brake rigging constructed in the manner described is that since the brake rigging is suspended from the truck by means of a separate brake carrier in the manner described, the brake shoes are always maintained in proper operative relation to the braking surfaces, which increases the efficiency of the brake rigging and permits heavy braking powers of the order of 250 per cent of the weight on the truck to be applied to the wheels to effect rapid deceleration of high speed trains. The fact that the shoes are always maintained in proper operative relation with the wheels also greatly facilitates a quick partial release of the brakes at all times following a brake application.

A further advantage of brake rigging constructed in the manner described is that since the brake shoes are applied to brake drums rather than to the wheels, the braking surfaces can be made larger than would otherwise be possible, thereby permitting a reduction in the unit shoe pressure. Moreover, wear on the wheels due to the brake shoes is eliminated and damage to the wheel tread due to the heat of brake shoe friction is prevented.

Although I have herein shown and described only one form of brake rigging embodying my invention, it is understood that various changes and modifications may be made therein within the scope of the appended claims without departing from the spirit and scope of my invention.

Having thus described my invention, what I claim is:

1. In a railway vehicle truck comprising a truck frame mounted on spaced wheel and axle assemblies, a brake carrier independent of the truck frame journaled on said wheel and axle assemblies and held in a substantially fixed position relative to the axes of said wheel and axle assemblies, brake rigging mounted solely on said carrier capable of making heavy brake applications to said truck, and means for cushioning said carrier against shocks in such manner that said brake rigging will be retained in proper operative relation with said wheel and axle assemblies during heavy applications of the brakes irrespective of said cushioning means.

2. In a railway vehicle truck comprising a truck frame mounted on spaced wheel and axle assemblies, a pair of brake drums mounted on each axle inboard of the wheels, a brake carrier independent of the truck frame journaled on said axles between said brake drums and held in a substantially fixed position relative to the axes of said axles, a brake cylinder mounted on said carrier between the drums of each pair, and means supported from said carrier and actuated by said cylinder for applying clasp brakes to each brake drum.

3. In a railway vehicle truck comprising a truck frame mounted on spaced wheel and axle assemblies, a brake carrier independent of the truck frame journaled on said axles by means which holds said carrier in a substantially fixed position relative to the axes of said axles, a pair of brake drums mounted on each axle on opposite sides of said carrier, a pair of dead levers associated with each wheel and axle assembly, each said dead lever being suspended from the brake carrier adjacent one side of an associated brake drum and being provided intermediate its ends with a brake element for cooperation with the associated drum, a first brake beam supported by each pair of dead levers at one side of the associated drums, a pair of live levers associated with each wheel and axle assembly, each said live lever being suspended from the brake carrier adjacent a different brake drum at the side opposite to the associated dead lever, pull rods connecting the lower ends of said live levers with said first brake beam, a second brake beam suspended from said carrier by means of hangers adjacent each pair of live levers and connected with said live levers intermediate their ends, brake elements mounted on each end of said second brake beams for cooperation with the associated drums, and means connected with the upper ends of said live levers for actuating them.

4. In a railway vehicle truck, the combination with a truck frame mounted on spaced wheel and axle assemblies, of pairs of live and dead truck levers movably supported from a brake carrier journaled on the axles, said brake carrier being independent of the truck frame and being held in a substantially fixed position relative to the axes of said axles, brake elements secured to said dead truck levers intermediate their ends for cooperation with braking surfaces rotatable with the wheels, a brake beam supported by each pair of dead levers and connected by means of pull rods with the lower ends of the associated pair of live levers, other brake beams supported from said carrier adjacent each wheel and axle assembly by means of hangers suspended from said carrier and each connected with the associated pair of live levers intermediate their ends and each provided at each end with brake elements for cooperation with said braking surfaces, and means connected with the upper ends of said live levers for actuating them.

5. In a railway vehicle truck, the combination with a truck frame mounted on spaced wheel and axle assemblies, of pairs of live and dead truck levers movably supported from a brake carrier journaled on the axles, said brake carrier being independent of the truck frame and being held in a substantially fixed position relative to the axes of said axles, brake elements secured to said dead truck levers intermediate their ends for cooperation with braking surfaces rotatable with the wheels, a brake beam supported by each pair of dead levers and connected by means of pull rods with the lower ends of the associated pair of live levers, other brake beams supported from said carrier by means of hangers suspended from said carrier and each connected with the associated pair of live levers intermediate their ends and each provided at its ends with brake elements for cooperation with said braking surfaces, a brake cylinder secured to said brake carrier at each end of the truck and provided with a push rod, and an equalizer associated with each brake cylinder and pivotally connected intermediate its ends to the associated push rod and connected at its ends by means of pull rods to the upper ends of the associated pair of live levers for actuating them.

6. In a railway vehicle truck, the combination with spaced wheel and axle assemblies, of a brake carrier journaled on said axles, a pair of brake drums mounted on one axle on opposite sides of said carrier, a pair of live levers extending downwardly through lever slots provided in said carrier and supported from the carrier by means of pin and roller assemblies the rollers of which ride on the carrier on opposite sides of said slots, and means connected with said live levers intermediate their ends and at their lower ends respectively and responsive to a force applied to the upper ends of said live levers for applying clasp brakes to said brake drums.

7. In a railway vehicle truck, the combination with spaced wheel and axle assemblies, of a brake carrier journaled on said axles, a pair of brake drums mounted on one axle on opposite sides of said carrier, and means for applying clasp brakes to said brake drums including a pair of live levers extending downwardly through lever slots provided in said carrier and supported from the carrier by means of pin and roller assemblies.

THOMAS R. McGOWAN.